United States Patent
Guo et al.

(10) Patent No.: US 11,316,971 B2
(45) Date of Patent: Apr. 26, 2022

(54) METHOD FOR CONTROLLING TEMPERATURE OF TERMINAL, AND TERMINAL

(71) Applicant: Huawei Technologies Co., Ltd., Shenzhen (CN)

(72) Inventors: Jianhua Guo, Shenzhen (CN); Hu Peng, Shenzhen (CN); Weisheng Li, Shenzhen (CN); Sihua Tu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 16/473,851

(22) PCT Filed: Dec. 27, 2016

(86) PCT No.: PCT/CN2016/112488
§ 371 (c)(1),
(2) Date: Jun. 26, 2019

(87) PCT Pub. No.: WO2018/119708
PCT Pub. Date: Jul. 5, 2018

(65) Prior Publication Data
US 2019/0327359 A1    Oct. 24, 2019

(51) Int. Cl.
*H04M 1/725* (2021.01)
*H04M 1/72463* (2021.01)
(Continued)

(52) U.S. Cl.
CPC ...... *H04M 1/72463* (2021.01); *G06F 9/5027* (2013.01); *G08B 21/182* (2013.01);
(Continued)

(58) Field of Classification Search
CPC ......... H04M 1/72577; H04M 1/72525; H04M 1/72569; G06F 9/5027; G06F 1/3206;
(Continued)

(56) References Cited

U.S. PATENT DOCUMENTS

| 5,117,504 A | 5/1992 | Dennerlein et al. |
| 2013/0027115 A1* | 1/2013 | Park .......................... G06F 1/206 327/512 |

(Continued)

FOREIGN PATENT DOCUMENTS

| CN | 101162470 A | 4/2008 |
| CN | 101958986 A | 1/2011 |

(Continued)

OTHER PUBLICATIONS

Foreign Communication From A Counterpart Application, European Application No. 16925375.4, Extended European Search Report dated Dec. 3, 2019, 8 pages.

(Continued)

*Primary Examiner* — Mazda Sabouri
(74) *Attorney, Agent, or Firm* — Conley Rose, P.C.

(57) ABSTRACT

Embodiments of the present invention relate to a method for controlling temperature of a terminal, including: receiving, by the terminal, an instruction for triggering execution of a first task; obtaining, by the terminal, a current temperature of the terminal; and controlling, by the terminal, an execution manner of the first task based on the current temperature, to control temperature of the terminal. When the terminal obtains the current temperature of the terminal, the terminal may control, based on the current temperature of the terminal, the first task to be executed in different manners, so as to control temperature of the terminal and ensure that the mobile phone is in a safe state.

14 Claims, 6 Drawing Sheets

A terminal receives an instruction for triggering execution of a first task

The terminal obtains a current temperature of the terminal

The terminal controls an execution manner of the first task based on the current temperature

(51) Int. Cl.
*G06F 9/50* (2006.01)
*G08B 21/18* (2006.01)
*H04L 67/00* (2022.01)
*H04W 52/02* (2009.01)
*H04M 1/72406* (2021.01)
*H04M 1/72454* (2021.01)

(52) U.S. Cl.
CPC ........ *H04L 67/34* (2013.01); *H04M 1/72406* (2021.01); *H04M 1/72454* (2021.01); *H04W 52/0251* (2013.01)

(58) Field of Classification Search
CPC ........ G06F 1/329; G06F 1/3203; G06F 1/206; G06F 9/48; G08B 21/182; H04L 67/34; H04W 52/0251; Y02D 10/00; G05D 23/1951
See application file for complete search history.

(56) References Cited

U.S. PATENT DOCUMENTS

| | | | | |
|---|---|---|---|---|
| 2013/0103900 | A1* | 4/2013 | Chiu | G06F 1/3206 711/112 |
| 2015/0005980 | A1* | 1/2015 | Kim | G06F 1/203 700/300 |
| 2015/0146535 | A1 | 5/2015 | Koo | |
| 2015/0288792 | A1* | 10/2015 | Nayak | H04M 1/675 455/558 |
| 2016/0065723 | A1* | 3/2016 | Jung | G16H 40/63 340/586 |
| 2017/0344100 | A1* | 11/2017 | Shi | G06F 1/3206 |

FOREIGN PATENT DOCUMENTS

| | | | |
|---|---|---|---|
| CN | 101984644 | A | 3/2011 |
| CN | 102968139 | A | 3/2013 |
| CN | 103064799 | A | 4/2013 |
| CN | 103400489 | A | 11/2013 |
| CN | 104199727 | A | 12/2014 |
| CN | 105100422 | A | 11/2015 |
| CN | 105391841 | A | 3/2016 |
| CN | 105450873 | A | 3/2016 |
| CN | 105573372 | A | 5/2016 |
| CN | 105630594 | A | 6/2016 |
| CN | 105898027 | A | 8/2016 |
| CN | 106133638 | A | 11/2016 |

OTHER PUBLICATIONS

Machine Translation and Abstract of Chinese Publication No. CN101162470, Apr. 16, 2008, 25 pages.
Machine Translation and Abstract of Chinese Publication No. CN101958986, Jan. 26, 2011, 14 pages.
Machine Translation and Abstract of Chinese Publication No. CN101984644, Mar. 9, 2011, 8 pages.
Machine Translation and Abstract of Chinese Publication No. CN103400489, Nov. 20, 2013, 11 pages.
Machine Translation and Abstract of Chinese Publication No. CN104199727, Dec. 10, 2014, 27 pages.
Machine Translation and Abstract of Chinese Publication No. CN105100422, Nov. 25, 2015, 19 pages.
Machine Translation and Abstract of Chinese Publication No. CN105450873, Mar. 30, 2016, 11 pages.
Machine Translation and Abstract of Chinese Publication No. CN105573372, May 11, 2016, 13 pages.
Machine Translation and Abstract of Chinese Publication No. CN105630594, Jun. 1, 2016, 17 pages.
Machine Translation and Abstract of Chinese Publication No. CN105898027, Aug. 24, 2016, 13 pages.
Foreign Communication From a Counterpart Application, PCT Application No. PCT/CN2016/112488, English Translation of International Search Report dated Sep. 11, 2017, 2 pages.
Foreign Communication From a Counterpart Application, PCT Application No. PCT/CN2016/112488, English Translation of Written Opinion dated Sep. 11, 2017, 3 pages.

* cited by examiner

METHOD FOR CONTROLLING TEMPERATURE OF TERMINAL, AND TERMINAL

CROSS-REFERENCE TO RELATED APPLICATIONS

This application is a national stage of International Application No. PCT/CN2016/112488, filed on Dec. 27, 2016, which is hereby incorporated by reference in its entirety.

TECHNICAL FIELD

Embodiments of the present invention relate to the communications field, and in particular, to a method for controlling temperature of a terminal, and a terminal.

BACKGROUND

Nowadays, applications on mobile phones are ever increasing. As on duration of a mobile phone increases, a plurality of applications run on the mobile phone concurrently, and most applications keep running when the mobile phone is on. As a result, the concurrent and continuous running of the large quantity of applications increases cumulative heat emission of the mobile phone. When a plurality of applications are downloaded, updated, or installed in batches on a mobile phone, increase of heat emission of the mobile phone is especially obvious.

Batch update is used as an example. When a plurality of applications are installed on a mobile phone, during a periodic update inspection process, an application store may find that at least two applications need to be updated, and the mobile phone may update the at least two applications based on user selection or an internal instruction of the mobile phone. An intermediate process does not require user participation or mobile phone participation. Such update of at least two applications may be called batch update.

In a batch update process of applications, the mobile phone usually receives one batch update instruction from a user before updating the applications in batches, to complete batch update of the applications; or if the mobile phone has obtained user authorization, the mobile phone is instructed by an internal instruction to perform a batch update operation. Regardless of the user instruction or the internal instruction of the mobile phone, all applications except a first application do not require user participation or mobile phone participation in the batch update process of the applications. Installation is performed after each upgrade package of the plurality of applications is downloaded, until update of the plurality of applications is completed finally.

Downloading and installation of the upgrade packages of the plurality of applications are successive, resulting in intense power consumption. Consequently, temperature of the mobile phone rises rapidly, giving a sense of too much heat.

SUMMARY

Embodiments of the present invention provide a method for controlling temperature of a terminal, and a terminal, so as to control terminal temperature to be in a safe range, ensure that a mobile phone is in a safe state, and improve comfort of and safety in user use. According to a first aspect, an embodiment of the present invention provides a method for controlling temperature of a terminal, including: receiving, by the terminal, an instruction for triggering execution of a first task; obtaining, by the terminal, a current temperature of the terminal; and controlling, by the terminal, an execution manner of the first task based on the current temperature, to control temperature of the terminal.

According to the first aspect of this embodiment of the present invention, when the terminal obtains the current temperature of the terminal, the terminal may control, based on the current temperature of the terminal, the first task to be executed in different manners, so as to control temperature of the terminal and ensure that the mobile phone is in a safe state.

In the first aspect, the first task includes: downloading an application, updating an application on the terminal, installing an application, starting an application on the terminal, or starting a background process.

Optionally, the controlling, by the terminal, an execution manner of the first task based on the current temperature includes: if the current temperature is lower than a first temperature, executing, by the terminal, the first task; or if the current temperature is higher than or equal to the first temperature, suspending, by the terminal, the first task.

In the foregoing optional solution, when receiving the instruction for triggering execution of the first task, the terminal obtains the current temperature of the terminal, and controls the execution manner of the first task based on the current temperature. This ensures that the terminal can be in a safe temperature range, and improves safety of the terminal in use by a user.

Optionally, the controlling, by the terminal, an execution manner of the first task based on the current temperature includes: if the current temperature is lower than a first temperature, executing, by the terminal, the first task; if the current temperature is higher than or equal to the first temperature and lower than a second temperature, suspending, by the terminal, the first task; or if the current temperature is higher than or equal to the second temperature, skipping, by the terminal, execution of the first task.

In the foregoing optional solution, when the current temperature of the terminal is higher than or equal to the second temperature, the terminal skips execution of the first task. This ensures that the terminal no longer executes a newly triggered task, thereby ensuring that temperature of the terminal is suppressed and improving terminal safety.

Optionally, after the terminal suspends execution of the first task, the method further includes: obtaining, by the terminal, a real-time temperature of the terminal at a preset interval, and when the obtained real-time temperature is lower than the first temperature, executing, by the terminal, the first task.

In the foregoing optional solution, the real-time temperature of the terminal is obtained at the preset interval. This ensures that the terminal is in a safe temperature range, and further improves safety of the terminal.

Optionally, when the current temperature of the terminal is higher, the preset interval is longer.

In the foregoing optional solution, the preset interval is dynamically adjusted, and extra heat emission by the terminal is controlled, ensuring safety of the terminal.

Optionally, after the terminal suspends execution of the first task, the method further includes: when duration of the suspension of the first task reaches first preset duration, executing, by the terminal, the first task.

In the foregoing optional solution, when the current temperature of the terminal has exceeded a safe temperature threshold, execution of the triggered. Firstly task is suspended, and starts after the first preset duration. This suppresses continuous and sharp rise of the terminal temperature and ensures safety of the terminal.

Optionally, after the terminal suspends execution of the first task, the method further includes: if the current temperature is higher than or equal to the first temperature and lower than a second temperature, when duration of the suspension of the first task reaches second preset duration, executing, by the terminal, the first task; or if the current temperature is higher than or equal to the second temperature, when duration of the suspension of the first task reaches third preset duration, executing, by the terminal, the first task, where the second preset duration is less than the third preset duration.

In the foregoing optional solution, the terminal sets more temperature ranges based on different impacts of different temperatures of the terminal on safety of the terminal, and sets different suspension duration for the different temperature ranges, so that a higher temperature of the terminal is accompanied by longer suspension duration. This better ensures safety of the terminal and increases flexibility of temperature control for the terminal.

Optionally, after the obtaining, by the terminal, a current temperature of the terminal and before the suspending, by the terminal, the first task, the method further includes: outputting, by the terminal, alert information indicating whether to suspend execution of the first task; or if the terminal receives an instruction for suspending execution of the first task, suspending, by the terminal, execution of the first task.

Optionally, after the obtaining, by the terminal, a current temperature of the terminal and before the skipping, by the terminal, execution of the first task, the method further includes: outputting, by the terminal, alert information indicating that the first task is not executed.

In the foregoing two optional solutions, the terminal makes, by outputting the alert information, a user know that the current temperature of the terminal is excessively high. This is beneficial for the user to perform a subsequent operation on the terminal and improves user experience.

Optionally, after the suspending, by terminal, the first task, the method further includes: displaying, on a screen of the mobile phone, an alert sign of excessively high temperature of the mobile phone.

In the foregoing optional solution, by displaying the alert sign on the screen of the terminal, the terminal makes the user clearer about of operations inside the terminal. This improves user experience.

According to a second aspect, an embodiment of the present invention provides a terminal, including a receiving unit, a temperature obtaining unit, and a control unit, where the receiving unit is configured to receive an instruction for triggering execution of a first task, the temperature obtaining unit is configured to obtain a current temperature of the terminal, and the control unit is configured to control an execution manner of the first task based on the current temperature, to control temperature of the terminal.

According to the second aspect of this embodiment of the present invention, when the terminal obtains the current temperature of the terminal, the terminal may control, based on the current temperature of the terminal, the first task to be executed in different manners, so as to control temperature of the terminal and ensure that the mobile phone is in a safe state.

In an optional solution of the second aspect, the terminal may execute any of the optional solutions of the first aspect.

According to a third aspect, an embodiment of the present invention provides a terminal, including a processor and a memory, where the processor is configured to read program code stored in the memory, to execute: receiving an instruction for triggering execution of a first task; obtaining a current temperature of the terminal; controlling an execution manner of the first task based on the current temperature, to control temperature of the terminal.

According to the third aspect of this embodiment of the present invention, when the terminal obtains the current temperature of the terminal, the terminal may control, based on the current temperature of the terminal, the first task to be executed in different manners, so as to control temperature of the terminal and ensure that the mobile phone is in a safe state.

In an optional solution of the third aspect, the terminal may execute any of the optional solutions of the first aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention are applicable to a terminal. The terminal may be a mobile phone, a tablet computer, a notebook computer, a UMPC (Ultra-mobile Personal Computer, ultra-mobile personal computer), a netbook, a PDA (Personal Digital Assistant, personal digital assistant), a wearable device, or the like. The embodiments of the present invention are described by using an example in which the terminal is a mobile phone.

Figure 1:
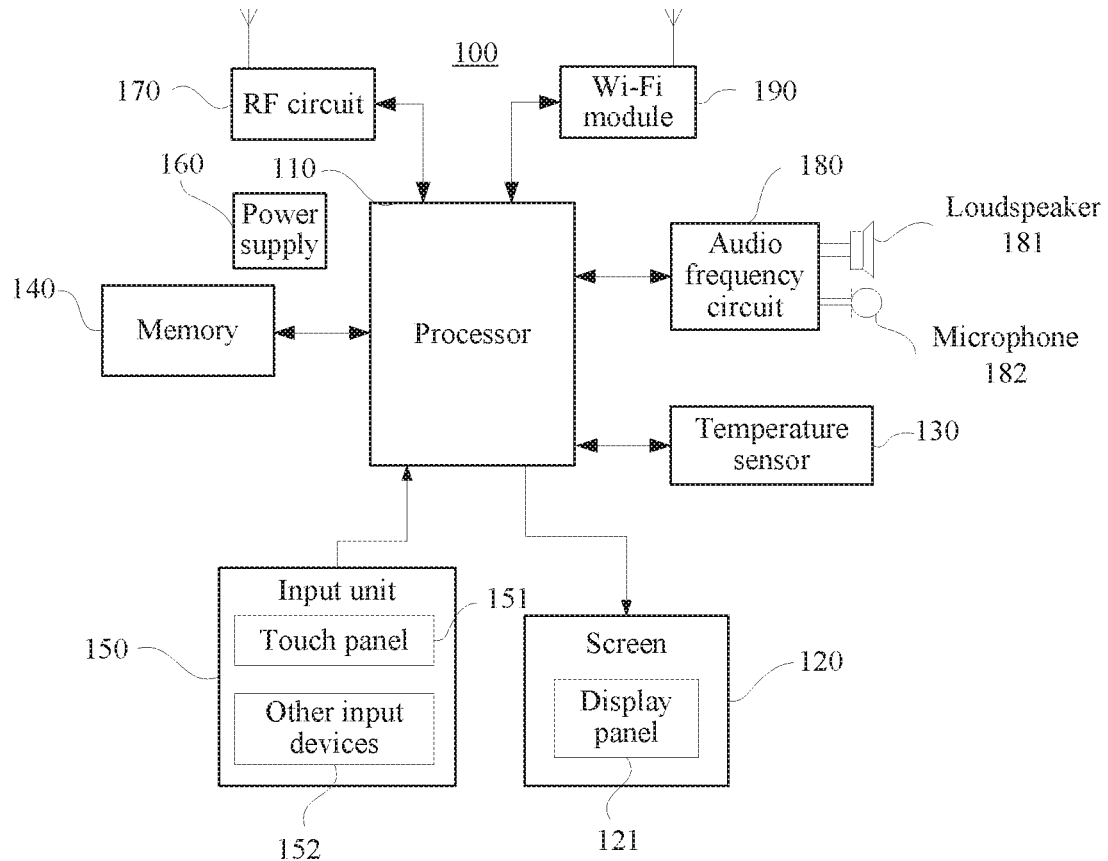
FIG. 1 is a block diagram of a partial structure of a mobile phone related to the embodiments of the present invention.

FIG. 1 is a block diagram of a partial structure of a mobile phone 100 related to the embodiments of the present invention. As shown in FIG. 1, the mobile phone 100 includes components such as a processor 110, a screen 120, a memory 140, an input unit 150, and a power supply 160. A person skilled in the art can understand that the structure of the mobile phone 100 shown in FIG. 1 does not constitute a limitation on the mobile phone, and the mobile phone may include more or fewer components than those shown in the figure, combine some components, or have different component arrangements.

The following describes the constituent components of the mobile phone 100 in detail with reference to FIG. 1.

The processor 110, as a control center of the mobile phone 100, is connected to various pails of the entire mobile phone 100 by using various interfaces and lines, and executes various functions of the mobile phone 100 and processes data by running or executing software programs and/or modules stored in the memory 140 and calling data stored in the memory 140, so as to perform overall monitoring on the mobile phone 100. The processor 110 may be an application processor, or may be a baseband processor, or even may be integrating a baseband processor and an application processor; or the processor includes a baseband processor and an application processor. The application processor mainly processes an operating system, a user interface, application programs, and the like. The baseband processor is responsible for data processing and storage, whose main components are units such as a digital signal processor, a microcontroller, and a memory, and whose main functions are baseband encoding/decoding, speech coding, video coding, and the like. As technologies develop, the baseband processor may also provide a multimedia function and related interfaces for a multimedia display, an image sensor, and an audio device.

The screen 120 may be configured to display information entered by a user or information provided for the user, or may display various menus of the mobile phone 100. The screen 120 may include a display panel 121. Optionally, the display panel 121 may be configured in a form of a liquid crystal display (Liquid Crystal Display, LCD for short), an organic light-emitting diode (Organic Light-Emitting Diode, OLED for short), or the like.

Further, a touch panel 151 of an input unit 150 may cover the screen 120. When detecting a touch operation on or near the touch panel 151, the touch panel 151 may transmit this touch event to the processor 110 by using a mobile industry processor interface (MIPI interface for short), to determine a type of the touch event. The processor 110 provides a corresponding visual output on the screen 120 based on the type of the touch event. In FIG. 1, the touch panel 151 and the screen 120 act as two independent parts to implement input and display functions of the mobile phone 100. However, in some embodiments, the touch panel 151 and the screen 120 may be integrated to implement the input and display functions of the mobile phone 100.

The sensor 130 may be configured to detect various external parameters of the mobile phone. The mobile phone includes a temperature sensor, and may also include at least one of sensors such as a light sensor, a motion sensor, a density sensor, and a fingerprint sensor. Specifically, the temperature sensor includes a thermistor, a thermocouple, a resistance temperature detector, an IC temperature sensor, and the like, and is configured to obtain temperatures of various components of the mobile phone 100. The light sensor may include a sensor other than an ambient light sensor, for example, including a proximity sensor. The proximity sensor may detect whether there is an object approaching or contacting the mobile phone 100, and may make the mobile phone 100 turn off the display panel 141 and/or backlight when the mobile phone 100 moves to an ear. As a type of motion sensor, an accelerometer sensor may detect magnitudes of accelerations in various directions (generally three axes), may detect a magnitude and a direction of gravity when the mobile phone 100 is stationary, and may be configured for use by applications recognizing gestures (for example, horizontal and vertical screen switch, related games, and magnetometer posture calibration) of the mobile phone 100, vibration recognition based functions (such as a pedometer and tapping), and the like. The density sensor may detect density of a matter in contact with the mobile phone 100. The fingerprint collection sensor is configured to collect a fingerprint entered by a user. The mobile phone 100 may be further configured with other sensors such as a gyroscope, a barometer, a hygrometer, and an infrared sensor. Details are not described herein.

The memory 140 may be configured to store software programs or modules. The processor 110 executes various functions and applications of the mobile phone 100 and processes data by running the software programs or the modules stored in the memory 140. The memory 140 may mainly include a program storage area and a data storage area. The program storage area may store an operating system, an application program required by at least one function (for example, an audio playback function or an image playback function), and the like. The data storage area may store data (for example, audio data and image data) created based on use of the mobile phone 100, and the like. In addition, the memory 140 may be a high-speed random access memory, or may be a non-volatile memory, for example, at least one disk memory, a flash memory, or another volatile solid-state memory.

The mobile phone 100 further includes a power supply 160 (for example, a battery) supplying power to all components. Preferably, the power supply may be logically connected to the processor 110 by using a power management system. In this way, functions such as charge and discharge management and power consumption management are implemented by using the power management system.

The mobile phone 100 may further include an RF (radio frequency, radio frequency) circuit 170, an audio frequency circuit 180, a Wi-Fi (Wireless Fidelity, Wireless Fidelity) module 190, and the like. Details are not described herein.

Figure 2:
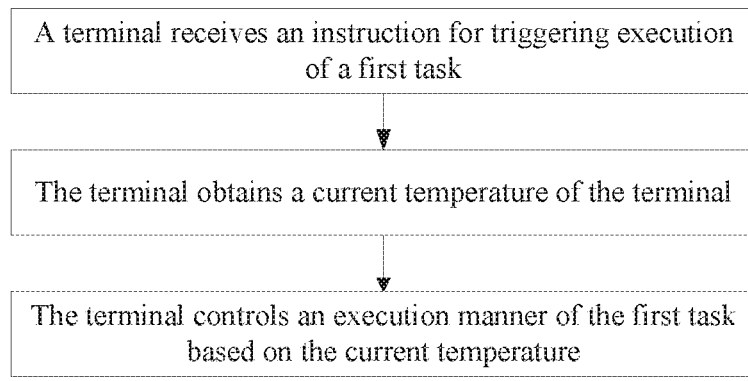
FIG. 2 is a flowchart of a method for controlling temperature of a terminal according to an embodiment of the present invention.

The following describes a method for controlling temperature of a terminal according to an embodiment of the present invention in detail with reference to FIG. 2 by using a mobile phone as an example.

As shown in FIG. 2, the method for controlling temperature of a terminal according to this application may include the following steps.

A mobile phone receives an instruction for triggering execution of a first task.

The first task is generally any task that requires participation and execution of a processor 110. The first task may include, for example, downloading an application, updating an application on the terminal, installing an application, starting an application on the terminal, or starting a background process.

It should be noted that the first task may alternatively be a batch task, for example, batch download of applications, batch update of applications on the mobile phone, batch installation of applications, batch start of applications, or batch start of background programs.

The instruction for triggering execution of the first task, that is received by the mobile phone, for example, may be that, when a user taps a music application 301, the mobile phone receives an instruction for triggering start of the music application 301; or may be that, in a batch application update process when a user selects to update all applications or when the mobile phone updates all applications by default, the mobile phone receives an instruction from the processor 110 for triggering download of an upgrade package of a second application, after downloading an upgrade package of a first application is completed.

S102: The mobile phone obtains a current temperature of the mobile phone.

The current temperature of the mobile phone, obtained by the mobile phone, is a current temperature of the mobile phone obtained through the following operations: when receiving the instruction for triggering execution of the first task, the mobile phone sends an instruction for obtaining a current temperature of the mobile phone to a temperature detection unit; and the temperature detection unit reads a current temperature of the mobile phone after receiving the temperature obtaining instruction, and sends the read current temperature of the mobile phone to the processor 110.

As shown in FIG. 1, the mobile phone includes a temperature sensor 130. The temperature sensor may act as a temperature detection unit configured to detect a temperature of the mobile phone. A thermistor is used as an example in this embodiment of the present invention. However, the temperature detection unit may alternatively be other temperature sensors, which are not enumerated one by one herein.

The mobile phone may include at least one thermistor, configured to measure a temperature of the processor 110. Optionally, the mobile phone may include a plurality of thermistors, configured to measure temperatures of hardware structures such as the processor 110, a battery 160, and a display screen 120, respectively. Correspondingly, the obtaining, by the mobile phone, the current temperature of the mobile phone itself, may be obtaining the temperature of the processor 110 of the mobile phone, may be obtaining a temperature of the battery 160 of the mobile phone, or may be obtaining a temperature of the display screen 120 of the mobile phone. This is not limited herein.

S103: The mobile phone controls an execution manner of the first task based on the current temperature, to control temperature of the mobile phone.

When the mobile phone obtains the current temperature of the mobile phone, the mobile phone may control, based on the current temperature of the mobile phone, the first task to be executed in different manners, so as to control temperature of the mobile phone and ensure that the mobile phone is in a safe state.

The following describes how the execution manner of the first task is controlled based on the current temperature in detail.

In this embodiment of the present invention, the mobile phone may determine which temperature range the current temperature falls in, and further control the execution manner of the first task on the mobile phone based on a control policy corresponding to different temperature ranges. The control policy may include: executing the first task and suspending the first task.

The control policy includes a plurality of temperature ranges and control modes corresponding to the plurality of temperature ranges. The control policy may be embodied in a form of an algorithm, or may be written into a ROM system in a form of a configuration file. This is not limited herein.

The control policy may be, for example, in a form of Table 1:

TABLE 1

| Temperature range (° C.) | Execution manner |
| --- | --- |
| T < A | Normal execution |
| T ≥ A | Suspending execution |

Herein, A is a safe temperature threshold, T is the current temperature of the mobile phone, and both and A are measured by degrees Celsius (° C.). It should be noted that in Table 1, two temperature ranges and execution manners corresponding to the two temperature ranges are used as examples, and more temperature ranges and first task execution manners corresponding to these temperature ranges may be included in this embodiment of the present invention.

As shown in Table 1, the control policy may be as follows.

When the mobile phone obtains the current temperature T of the mobile phone, the mobile phone compares the obtained current temperature T of the mobile phone with A. If the current temperature T of the mobile phone is lower than A, the current temperature of the mobile phone is lower than the safe temperature threshold, and that the mobile phone can be used normally. In this case, the mobile phone executes the first task normally. Herein, that the mobile phone executes the first task means that, after determining a temperature range in which the current temperature of the mobile phone falls, the mobile phone executes the triggering instruction based on the received triggering instruction.

If the current temperature T of the mobile phone is higher than or equal to A, the current temperature of the mobile phone has exceeded the safe temperature range. In this case, the mobile phone suspends execution the first task. Herein, that the mobile phone suspends the first task means that, when determining a temperature range in which the current temperature of the mobile phone falls, the mobile phone suspends the first task, instead of executing the first task due to the triggering instruction.

It should be noted that a value of A in this embodiment of the present invention may be set based on an actual requirement, for example, may be any value such as 40, 46, 48, or 49.

This embodiment of the present invention is described by using A=48° C. as an example. If the current temperature of the mobile phone that is obtained by the mobile phone is 47° C., the mobile phone executes the first task; or if the current temperature of the mobile phone is 50° C., the mobile phone suspends the first task.

In this embodiment of the present invention, when receiving the instruction for triggering execution of the first task, the mobile phone obtains the current temperature of the mobile phone, and controls the execution manner of the first task based on the current temperature. This ensures that the mobile phone can be in a safe temperature range, and improves safety of the mobile phone in use by a user.

Further, if the current temperature T of the mobile phone is higher than or equal to A, after the mobile phone suspends execution of the first task, when suspension duration reaches first preset duration K1, the mobile phone executes the first task.

Herein, the first preset duration K1 is set to suppress sharp rise of the temperature of the mobile phone, and a value thereof may be set based on an actual condition. The first preset duration K1 required in this embodiment of the present invention is fulfilled provided that the temperature of the mobile phone is suppressed or drops after suspension for the first preset duration K1. In this embodiment of the present invention, K1 is measured in seconds (s), for example, 5 seconds, 7 seconds, or 10 seconds. This is not limited herein.

In this embodiment of the present invention, when the current temperature of the terminal has exceeded the safe temperature threshold, execution of the triggered first task is suspended, and starts after the first preset duration. This suppresses continuous and sharp rise of the terminal temperature and ensures safety of the terminal.

Optionally, after suspending execution of the first task, the mobile phone may obtain a real-time temperature of the mobile phone at a preset interval. When the obtained real-time temperature of the mobile phone is lower than a first temperature, the mobile phone is in a safe temperature range. In this case, the mobile phone executes the first task. The preset interval may be 0.5 seconds, 1 second, 3 seconds, 5 seconds, or the like.

In this embodiment of the present invention, when the current temperature of the mobile phone has exceeded the safe temperature threshold, execution of the first task is suspended. After execution of the first task is suspended, the real-time temperature of the mobile phone is detected at the preset interval. When the detected real-time temperature of the mobile phone is within the safe temperature range, the first task is executed, ensuring that the mobile phone executes a task within the safe temperature range, and further improving safety of the mobile phone.

Further, a higher current temperature of the mobile phone indicates a greater drop of the current temperature of the mobile phone, so that the temperature of the mobile phone can be lowered to the safe temperature range, and this takes a longer time. Frequent detection of the temperature of the mobile phone also increases heat emission of the mobile phone. Therefore, in this embodiment of the present invention, the preset interval may dynamically change with the current temperature of the mobile phone, and when the current temperature of the terminal is higher, the preset interval is longer. In this way, the preset interval is dynamically adjusted, and extra heat emission of the mobile phone is controlled, ensuring safety of the mobile phone.

Further, in this embodiment of the present invention, when the current temperature T of the mobile phone is higher than or equal to A, more temperature ranges are configured, so that different control modes are used for the mobile phone whose current temperature is in different temperature ranges.

For example, when T is higher than or equal to A, the temperature ranges may include $A \leq T < B$ and $T \geq B$, where $A < B$, T, A, and B are all measured by degrees Celsius (° C.), A is a safe temperature threshold, and B is a dangerous temperature threshold.

First Mode

If the current temperature T is higher than or equal to A and lower than B, the current temperature of the mobile phone has exceeded the safe temperature threshold, but is lower than the dangerous temperature threshold. After the first task is suspended, when suspension duration reaches second preset duration K2, the first task is executed. If the current temperature T of the mobile phone is higher than or equal to B, the current temperature of the mobile phone has exceeded the dangerous temperature threshold. After the mobile phone suspends execution of the first task, when suspension duration reaches third preset duration K3, the first task is executed. K3 is greater than K2, and measured in seconds (s); K2 is, for example, 5 seconds, 7 seconds, or 10 seconds; K3 is, for example, 10 seconds, 20 seconds, 40 seconds, or 70 seconds. Values of K2 and K3 may be set based on an actual condition, provided that theirs values can ensure that rapid rising of the temperature of the mobile phone can be suppressed after the suspension. This is not limited herein.

In this embodiment of the present invention, for example, A=48° C., B=52° C., K2=5 seconds, and K3=30 seconds. If the current temperature of the mobile phone is 53° C., after the mobile phone suspends execution of the first task, the first task is executed when the suspension duration reaches 30 seconds. If the current temperature of the mobile phone is 50° C., after the mobile phone suspends execution of the first task, the first task is executed when the suspension duration reaches 5 seconds. Values of A and B may be set based on an actual requirement, and are not limited in this embodiment of the present invention. Other values are also within the protection scope of this embodiment of the present invention.

A higher temperature of the mobile phone causes lower safety. Therefore, when the current temperature of the mobile phone has exceeded the dangerous temperature threshold, longer suspension duration is required than when the temperature of the mobile phone has exceeded the safe temperature threshold. This can suppress continuous excessively rapid rising of the temperature of the mobile phone. In this embodiment of the present invention, more temperature ranges are set based on different impacts of different temperatures of the mobile phone on safety of the mobile phone, and different suspension duration is set for the different temperature ranges, so that a higher temperature of the mobile phone is accompanied by longer suspension duration. This better ensures safety of the mobile phone and increases flexibility of temperature control for the mobile phone.

Second Mode

If the current temperature T is higher than or equal to A and lower than B, the current temperature of the mobile phone has exceeded the safe temperature threshold, but is lower than the dangerous temperature threshold. After the first task is suspended, when suspension duration reaches fourth preset duration K4, the first task is executed. If the current temperature T of the mobile phone is higher than or equal to B, the current temperature of the mobile phone has exceeded the dangerous temperature threshold. In this case, the mobile phone skips execution of the first task. K4 is measured in seconds (s), and K4 is, for example, 5 seconds, 7 seconds, or 10 seconds. A value of K4 may be set based on an actual condition, provided that the value can ensure that excessively rapid rising of the temperature of the mobile phone can be suppressed after the suspension. This is not limited herein.

In this embodiment of the present invention, for example, A=48° C., B=52° C., and K2=5 seconds. If the current temperature of the mobile phone is 53° C., the mobile phone skips execution of the first task, that is, although the mobile phone receives the instruction for triggering execution of the first task, the first task is not executed because the current temperature of the mobile phone is excessively high. If the current temperature of the mobile phone is 50° C., after the first task is suspended, the mobile phone performs the first task when suspension duration reaches 5 seconds.

A higher temperature of the mobile phone causes lower safety. Therefore, when the current temperature of the mobile phone has exceeded the dangerous temperature threshold, the mobile phone skips execution of the first task. This ensures that the mobile phone no longer executes a newly triggered task, thereby ensuring that the temperature of the mobile phone is suppressed and improving safety of the mobile phone.

Figure 3:
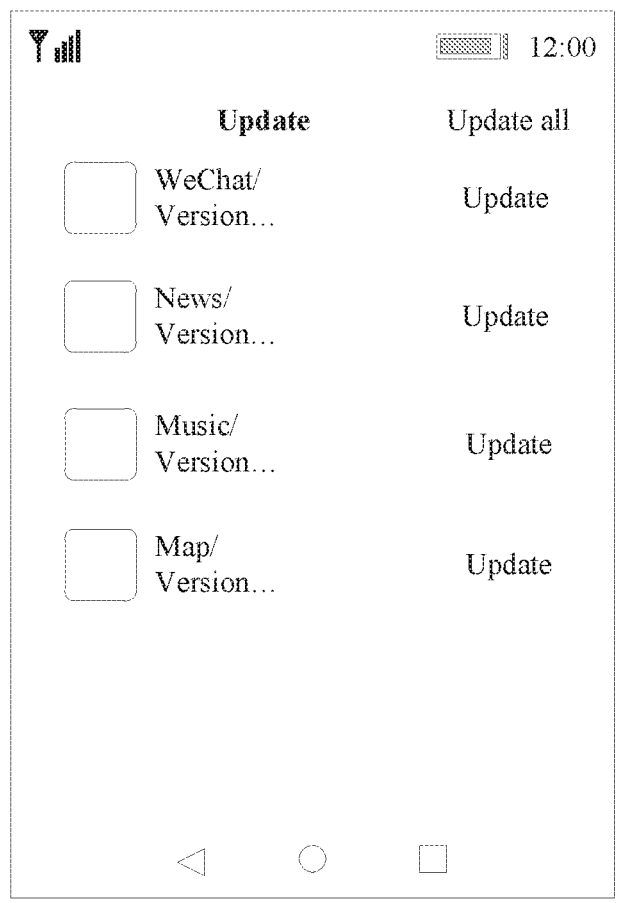
FIG. 3 is a schematic diagram of controlling temperature of a mobile phone during a batch download process of applications.

FIG. 3 is a schematic diagram of controlling temperature of a mobile phone during a batch download process of applications. The method for controlling temperature of a terminal in the embodiments of the present invention is described with reference to FIG. 3.

An application store on the mobile phone finds that four applications can be updated during a periodic inspection process for application update. If the user expects to update all the four applications, the user taps "Update all", so that the mobile phone receives an instruction for triggering execution of "Update all".

If the current temperature, obtained by the mobile phone, of the mobile phone is 47° C., the mobile phone can determine that the current temperature of the mobile phone is within the safe temperature range, and the mobile phone executes "Update all".

This embodiment of the present invention is described by using an example in which the applications are updated in an arrangement order in an update list when "Update all" is tapped. After updating "WeChat" is completed, the mobile phone receives an instruction from the processor 110 for triggering execution of updating "News".

If the current temperature of the mobile phone that is obtained by the mobile phone is 48° C., the mobile phone determines that the current temperature of the mobile phone has exceeded the safe temperature threshold, and the mobile phone suspends execution of updating "News", and after suspension duration reaches 5 seconds, updates "News". When updating "News" is completed, the mobile phone receives an instruction from the processor 110 for triggering execution of updating "Music".

If the current temperature of the mobile phone that is obtained by the mobile phone is 53° C., the mobile phone determines that the current temperature of the mobile phone has exceeded the dangerous temperature threshold, and the mobile phone suspends execution of updating "Music", and after suspension duration reaches 30 seconds, updates "Music".

The same method applies to an instruction received by the mobile phone for triggering execution of updating "Map", and further details are not described.

In this embodiment of the present invention, a manner is used in which different suspension duration is used for different temperature ranges of the mobile phone, so that the temperature of the mobile phone is better controlled without intermediate user participation, and safety of the mobile phone is ensured.

The foregoing suspending execution of the first task by the mobile phone is controlled inside the mobile phone without user awareness. Optionally, in this embodiment of the present invention, an alert sign of excessively high temperature of the mobile phone may be displayed. The alert sign may be displayed in a status bar of the mobile phone, or may be displayed at other positions on a display screen. Any position is within the scope of this embodiment of the present invention provided that the position gives the user an obvious sign that the current temperature of the mobile phone is excessively high.

Figure 4B:
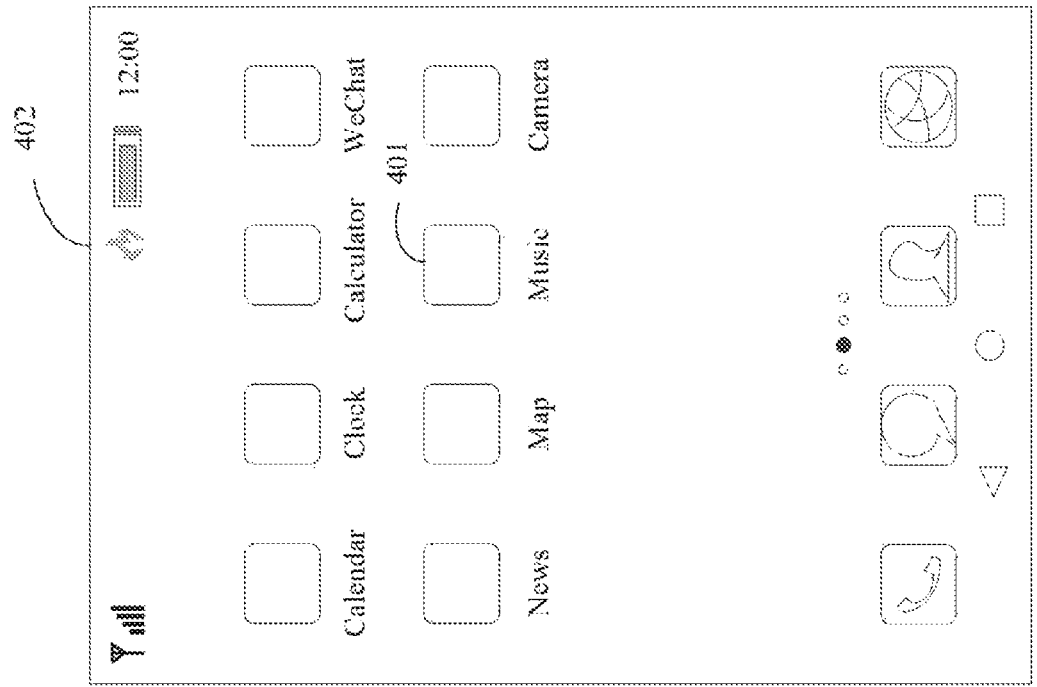
FIG. 4b is a schematic diagram of displaying, on a screen of a mobile phone, an alert sign of excessively high temperature of the mobile phone.
Figure 4A:
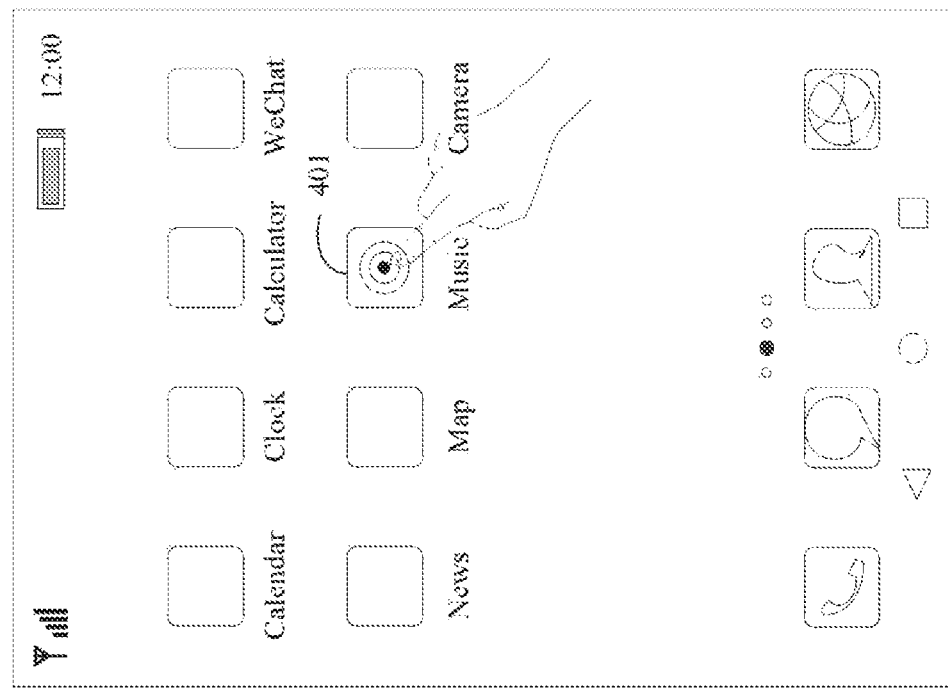
FIG. 4a is a schematic diagram of receiving, by a mobile phone, an instruction from a user for triggering execution of a music application.

In this embodiment of the present invention, FIG. 4*a* and FIG. 4*b* are used as examples to describe the displaying, on the screen of the mobile phone, an alert sign of excessively high temperature of the mobile phone. FIG. 4*a* is a schematic diagram of receiving, by a mobile phone, an instruction from a user for triggering execution of a music application. FIG. 4*b* is a schematic diagram of displaying, on a screen of a mobile phone, an alert sign of excessively high temperature of the mobile phone.

As shown in FIG. 4*a*, a user taps a music application 401. After the mobile phone receives an instruction from the user for triggering start of the music application 401, the mobile phone obtains a current temperature of the mobile phone.

If the current temperature of the mobile phone is 48° C., the current temperature of the mobile phone has exceeded the safe temperature threshold, and the mobile phone suspends execution of starting the music application 401.

As shown in FIG. 4*b*, a "torch" 402 sign is displayed in the status bar while the mobile phone suspends execution of starting the music application 401, to alert the user that the temperature of the mobile phone is relatively high at present.

When suspension duration reaches a preset duration, the "torch" 402 sign displayed in the status bar disappears, and the mobile phone executes the music application 401. The "torch" sign is merely an example, and any other signs that can alert that the temperature of the mobile phone is relatively high are within the scope of protection of this embodiment of the present invention.

By displaying, on the screen of the mobile phone, the sign of excessively high temperature of the mobile phone, the user is able to know background control of the mobile phone on the music application 401 triggered by the user, for example, suspension of starting of the music application 401. In this way, user experience is improved while the temperature is controlled.

Further, in this embodiment of the present invention, after the mobile phone obtains the current temperature of the mobile phone, and before the mobile phone suspends the first task, the method includes: outputting alert information indicating whether to suspend execution of the first task. The alert information may be a displayed alert box, or may be a voice output alert. If the mobile phone receives an instruction that the user selects, based on the alert information, to suspend execution of the first task, the mobile phone suspends execution of the first task. If the mobile phone receives an instruction that the user selects, based on the alert information, not to suspend execution of the first task, the mobile phone executes the first task.

In this embodiment of the present invention, the alert information is displayed on the screen of the mobile phone, and the user may make a selection based on the alert information. Although execution of the first task may continue when the user ignores an alert of excessively high temperature displayed by the mobile phone by selecting not to suspend execution of the first task, the mobile phone makes the user aware, by displaying the alert box on the mobile phone, that the current temperature of the mobile phone is excessively high. This is beneficial for the user to perform a subsequent operation on the mobile phone, and improves user experience.

Optionally, in this embodiment of the present invention, after the mobile phone obtains the current temperature of the mobile phone, and before the mobile phone skips execution of the first task, the method includes: outputting alert information indicating that the first task is not executed.

Figure 5B:
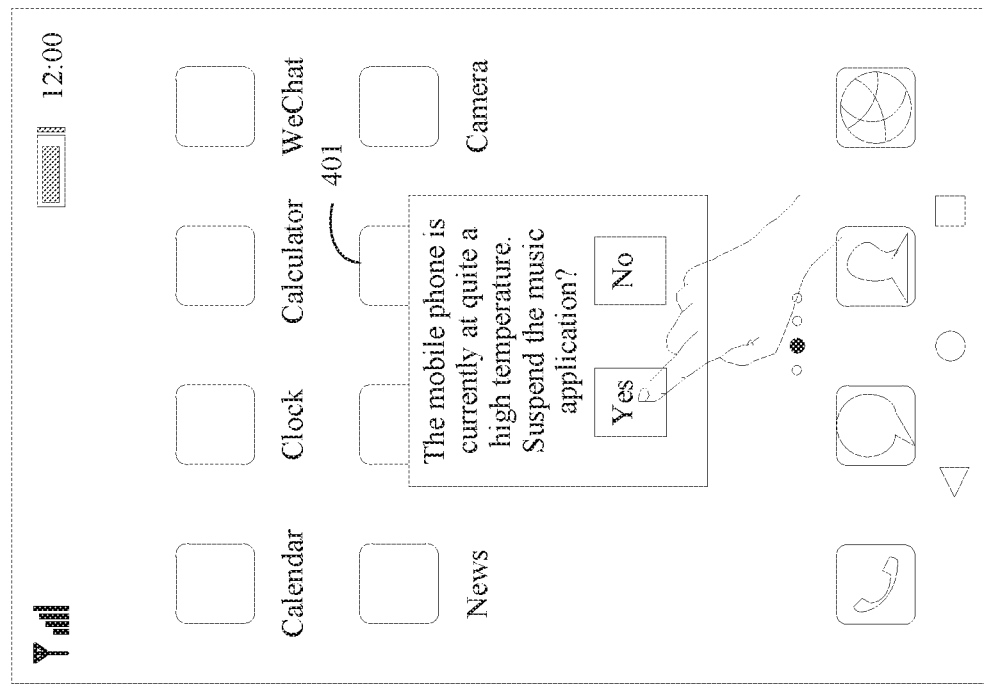
FIG. 5b is a schematic diagram of outputting, on a screen of a mobile phone, alert information that execution of a task is suspended.
Figure 5A:
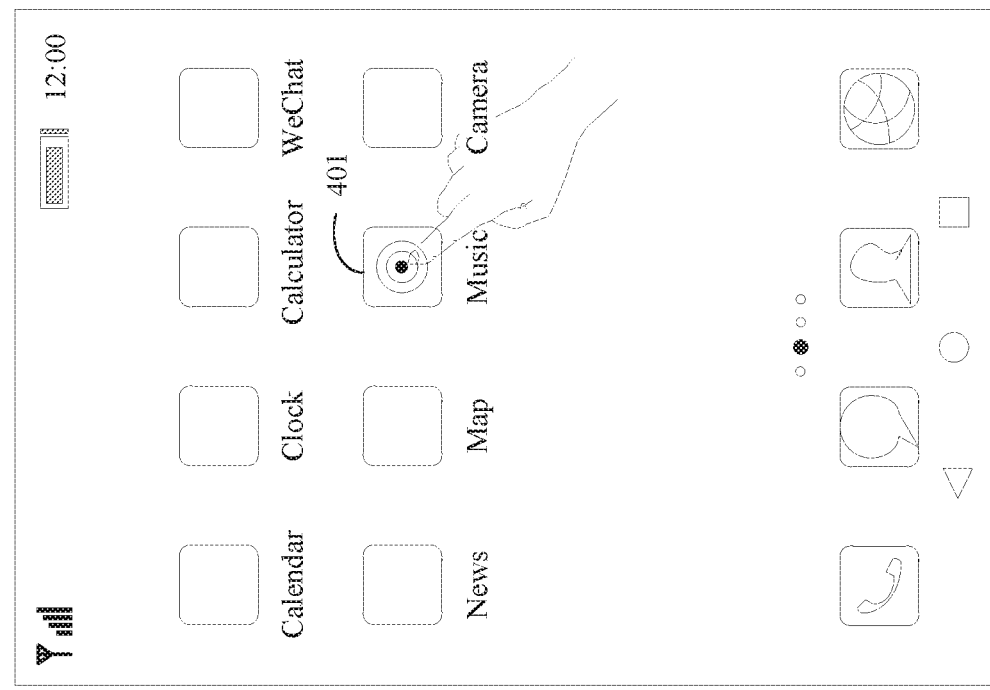
FIG. 5a is a schematic diagram of receiving, by a mobile phone, an instruction from a user for triggering execution of a music application.
Figure 5C:
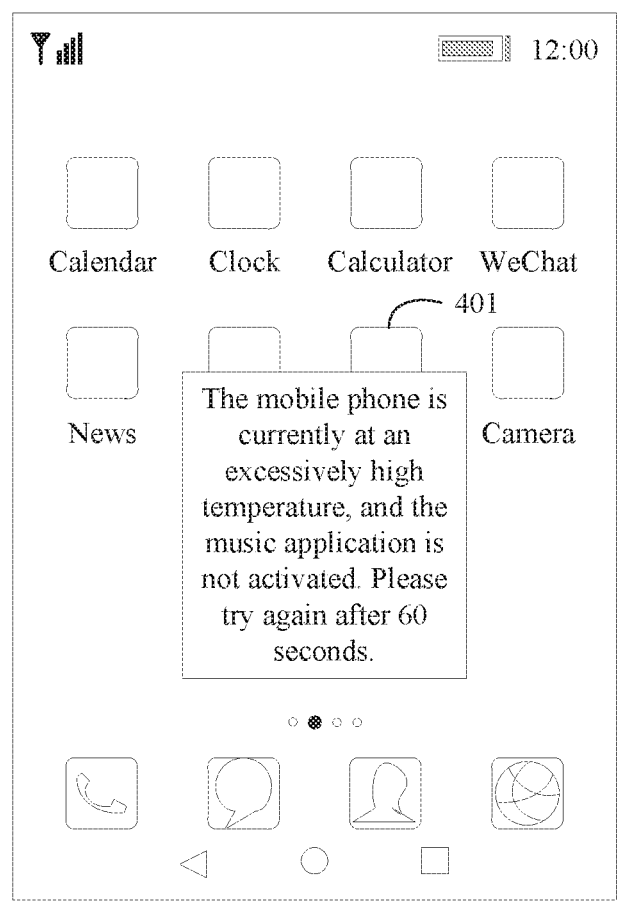
FIG. 5c is a schematic diagram of outputting, on a screen of a mobile phone, alert information that a task is not executed.

With reference to FIG. 5a to FIG. 5c, a method of controlling temperature of a mobile phone according to an embodiment of the present invention is described. FIG. 5a is a schematic diagram of showing, on a screen of a mobile phone, an alert sign of excessively high temperature of the mobile phone, FIG. 5b is a schematic diagram of outputting, on a screen of a mobile phone, alert information that execution of a task is suspended, and FIG. 5c is a schematic diagram of outputting, on a screen of a mobile phone, alert information that a task is not executed. Current temperatures of the mobile phone in the figures are merely examples, and are not intended to limit this embodiment of the present invention.

FIG. 5a is a schematic diagram of receiving, by a mobile phone, an instruction from a user for triggering execution of a music application. As shown in FIG. 5a a user taps a music application 401. After the mobile phone receives an instruction from the user for triggering start of the music application 401, the mobile phone obtains a current temperature of the mobile phone.

If the current temperature of the mobile phone is 47° C., the current temperature of the mobile phone is within the safe temperature range, and the mobile phone starts the music application 401.

If the current temperature of the mobile phone is 48° C., the current temperature of the mobile phone has exceeded the safe temperature threshold, but is lower than the dangerous temperature threshold. In this case, as shown in FIG. 5b, the mobile phone pops up an alert box to alert the user, for example, "The mobile phone is currently at quite a high temperature. Suspend the music application?", and there are options "Yes" and "No" provided for the user to select.

If the user selects "Yes", the mobile phone suspends the music application 401. After the music application 401 is suspended, the mobile phone performs temperature detection for the mobile phone at a preset interval of 0.5 seconds. If a detected temperature of the mobile phone is 47° C. at a third detection, that is, at 1.5 seconds after the suspension, the mobile phone starts the music application 401.

If the user selects "No", the mobile phone starts the application.

If the current temperature of the mobile phone is 51° C., the mobile phone suspends the music application 401 after the user selects "Yes". After the music application 401 is suspended, the mobile phone performs temperature detection for the mobile phone at a preset interval of 1.5 seconds. If a detected temperature of the mobile phone is 47° C. at a third detection, that is, at 4.5 seconds after the suspension, the mobile phone starts the music application 401.

If the current temperature of the mobile phone is 53° C., the current temperature of the mobile phone has exceeded the dangerous temperature threshold. In this case, as shown in FIG. 5c, the mobile phone pops up an alert box to inform the user, for example, "The mobile phone is currently at an excessively high temperature, and the music application is not activated. Please try again after 60 seconds", and the mobile phone does not start the music application. The alert box is automatically closed after a preset time.

The foregoing alert information displayed on the screen of the mobile phone is merely examples for description of this embodiment of the present invention. Any other alert information that can inform the user that the current temperature of the mobile phone is relatively high and what operation the mobile phone is to perform is within the protection scope of this embodiment of the present invention, and further details are not explained herein.

In this embodiment of the present invention, execution of the first task is controlled by alerting the user, so that the user can have better knowledge about the temperature of the mobile phone. This improves user operability on the temperature of the mobile phone, and ensures safety of the mobile phone.

Further, when the control policy is stored in a ROM system of the mobile phone in a form of a configuration file, because the configuration file is related to a mobile phone attribute, mobile phones with different attributes have different configuration files. The attribute of a mobile phone includes a model, a ROM version, and the like of the mobile phone.

The configuration file may be updated as the ROM version of the mobile phone is upgraded, or may be updated by using a corresponding server, that is, after updating a corresponding configuration file, the server synchronizes the configuration file in the mobile phone to update the configuration file in the mobile phone.

It should be noted that when the configuration file is updated by using the corresponding server, configuration files corresponding to different attribute information may be stored in the server, and these files may be stored in a list form or other forms.

For the case in which the configuration file is updated on a server side, the mobile phone periodically reports an attribute of the mobile phone, and the configuration file stored in the server performs artificial intelligence or intelligent computation based on the mobile phone attribute that is periodically reported by the mobile phone to find a matching configuration file corresponding to the attribute of the mobile phone, and updates the configuration file in the server based on a matching result.

When the mobile phone sends a message for obtaining a configuration file to the server, the server searches for, based on the attribute of the mobile phone, a configuration file corresponding to the attribute of the mobile phone, and returns the configuration file to the mobile phone, and the mobile phone updates an existing configuration file based on the returned configuration file.

In this embodiment of the present invention, the server is used to update the configuration file in the mobile phone, and timeliness and convenience of configuration file updating can be improved.

Figure 6:
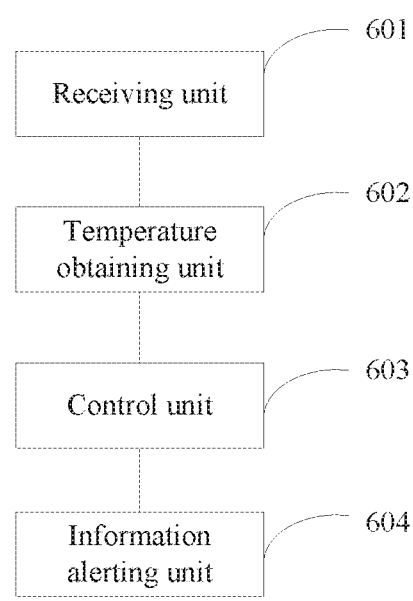
FIG. 6 is a schematic diagram of a terminal according to an embodiment of the present invention.

FIG. 6 is a schematic diagram of a terminal 600 according to an embodiment of the present invention. The terminal 600 can be used to execute the technical solution of the method for controlling temperature of a terminal according to any embodiment of the present invention. For related descriptions, definitions of technical terms, and technical effects in the embodiment shown in FIG. 6, reference may be made to the descriptions of the method for controlling temperature of a terminal according to any embodiment of the present invention. Details are not described herein again.

The terminal 600 includes:

a receiving unit 601, configured to receive an instruction for triggering execution of a first task;

a temperature obtaining unit 602, configured to obtain a current temperature of the terminal; and a control unit 603, configured to control an execution manner of the first task based on the current temperature, to control temperature of the terminal.

It should be noted that the first task includes: downloading an application, updating an application on the terminal, installing an application, starting an application on the terminal, or starting a background process.

Optionally, the control unit 603 is specifically configured to: if the current temperature is lower than a first temperature, execute the first task; or if the current temperature is higher than or equal to the first temperature, suspend the first task.

Optionally, the control unit 603 is specifically configured to: if the current temperature is lower than a first temperature, execute the first task; if the current temperature is higher than or equal to the first temperature and lower than a second temperature, suspend the first task; or if the current temperature is higher than or equal to the second temperature, skip execution of the first task.

Optionally, the temperature obtaining unit 602 is further configured to obtain a real-time temperature of the terminal at a preset interval. The control unit 603 is further configured to execute the first task when the real-time temperature obtained by the temperature obtaining unit 602 is lower than the first temperature.

Optionally, when the current temperature of the terminal is higher, the preset interval is longer.

Optionally, the control unit 603 is further configured to execute the first task when duration of the suspension of the first task reaches first preset duration.

Optionally, the control unit 603 is further configured to: if the current temperature is higher than or equal to the first temperature and lower than a second temperature, when duration of the suspension of the first task reaches second preset duration, execute the first task; or if the current temperature is higher than or equal to the second temperature, when duration of the suspension of the first task reaches third preset duration, execute the first task, where the second preset duration is less than the third preset duration.

Optionally, the terminal further includes an information alerting unit 604. The information alerting unit 604 is configured to output alert information indicating whether to suspend execution of the first task. The control unit 603 is further configured to: if the control unit 603 receives the instruction for suspending execution of the first task based on an alert from the information alerting unit 604, suspend execution of the first task.

Optionally, the terminal further includes an information alerting unit 604. The information alerting unit 604 is configured to output alert information indicating that the first task is not executed.

In this embodiment of the present invention, when the mobile phone obtains the current temperature of the mobile phone, the mobile phone may control, based on the current temperature of the mobile phone, the first task to be executed in different manners, so as to control temperature of the mobile phone and ensure that the mobile phone is in a safe state.

An embodiment of the present invention further provides a terminal, to perform the method for controlling temperature of a terminal according to any embodiment of the present invention. For all the following related descriptions, definitions of technical terms, and technical effects, reference may be made to the descriptions of the method for controlling temperature of a terminal according to any embodiment of the present invention, and details are not described herein again.

As shown in FIG. 1, a processor 110 is configured to read program code stored in a memory 140, to perform the following operations:

receiving an instruction for triggering execution of a first task; obtaining a current temperature of the terminal; and controlling an execution manner of the first task based on the current temperature, to control temperature of the terminal.

It should be noted that the first task includes: downloading an application, updating an application on the terminal, installing an application, starting an application on the terminal, or starting a background process.

Optionally, the processor 110 is specifically configured to: if the current temperature is lower than a first temperature, execute the first task; or if the current temperature is higher than or equal to the first temperature, suspend the first task.

Optionally, the processor 110 is specifically configured to: if the current temperature is lower than a first temperature, execute the first task; if the current temperature is higher than or equal to the first temperature and lower than a second temperature, suspend the first task; or if the current temperature is higher than or equal to the second temperature, not execute the first task.

Optionally, after the terminal suspends execution of the first task, the processor 110 is further configured to: obtain a real-time temperature of the terminal at a preset interval, and when the obtained real-time temperature is lower than the first temperature, execute the first task.

It should be noted that, when the current temperature of the terminal is higher, the preset interval is longer.

Optionally, after the terminal suspends execution of the first task, the processor 110 is further configured to execute the first task when duration of the suspension of the first task reaches first preset duration.

Optionally, after the terminal suspends execution of the first task, the processor 110 is further configured to: if the current temperature is higher than or equal to the first temperature and lower than a second temperature, when duration of the suspension of the first task reaches second preset duration, execute the first task; or if the current temperature is higher than or equal to the second temperature, when duration of the suspension of the first task reaches third preset duration, execute the first task, where the second preset duration is less than the third preset duration.

Optionally, after obtaining a current temperature of the terminal and before suspending the first task, the processor 110 is further configured to: output alert information indicating whether to suspend execution of the first task; or if the terminal receives an instruction for suspending execution of the first task, suspend execution of the first task.

Optionally, after obtaining a current temperature of the terminal and before skipping execution of the first task, the processor 110 is further configured to output alert information indicating that the first task is not executed.

According to this embodiment of the present invention, when the terminal obtains the current temperature of the terminal, the processor of the terminal may control, based on the current temperature of the terminal, the first task to be executed in different manners, so as to control temperature of the terminal and ensure that the mobile phone is in a safe state.

It may be clearly understood by a person skilled in the art that, for the purpose of convenient and brief description, division into the foregoing function modules is used as an example for illustration. In actual application, the foregoing functions may be allocated to different function modules and implemented depending on requirements. In other words, an inner structure of the apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections via some interfaces, apparatuses, or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for controlling a temperature of a terminal, comprising:
   receiving, by the terminal, an instruction for triggering execution of a first task, wherein the first task comprises at least one of downloading a first application, updating the first application on the terminal, installing the first application, starting the first application on the terminal, or starting a first background process;
   receiving, by the terminal, an instruction for triggering execution of a second task, wherein the second task comprises at least one of downloading a second application, updating the second application on the terminal, installing the second application, starting the second application on the terminal, or starting a second background process;
   obtaining, by the terminal, a current temperature of the terminal in response to receiving the instruction for triggering executing of the first task; and
   in response to receiving the instruction for triggering executing of the first task and the second task and obtaining the current temperature of the terminal, controlling, by the terminal, an execution manner of the first task based on the current temperature to control the temperature of the terminal by:
      executing, by the terminal, the first task and the second task in response to the current temperature being lower than a first temperature;
      suspending, by the terminal, the first task and executing, by the terminal, the second task in response to the current temperature being higher than or equal to the first temperature;
      before suspending the first task, displaying, by the terminal, a first alert information on a screen of the terminal, wherein the first alert information indicates that the current temperature is high and comprises a selection for whether to execute the first task or suspend the first task;
      executing, by the terminal, the first task in response to obtaining a first instruction to execute the first task and the current temperature being higher than or equal to the first temperature; and
      suspending, by the terminal, the first task in response obtaining a second instruction for suspending the first task.

2. A terminal, comprising:
a memory configured to store instructions; and
a processor coupled to the memory and configured to execute the instructions, which cause the processor to be configured to:
   receive an instruction for triggering execution of a first task, wherein the first task comprises downloading a first application, updating the first application on the terminal, installing the first application, starting the first application on the terminal, or starting a first background process;
   receive an instruction for triggering execution of a second task, wherein the second task comprises at least one of downloading a second application, updating the second application on the terminal, installing the second application, starting the second application on the terminal, or starting a second background process;
   obtain a current temperature of the terminal in response to the instruction for triggering executing of the first task being received; and
   in response to the instruction for triggering executing of the first task and the second task being received and the current temperature of the terminal being obtained, control an execution manner of the first task based on the current temperature to control a temperature of the terminal, wherein to control the execution manner of the first task, the instructions further cause the processor to be configured to:
      execute the first task and the second task in response to the current temperature being lower than a first temperature;
      suspend the first task and execute the second task in response to the current temperature being higher than or equal to the first temperature, before the first task is suspended, display a first alert information on a screen of the terminal, wherein the first alert information indicates that the current temperature is high and comprises a selection for whether to execute the first task or suspend the first task;

execute the first task in response to a first instruction for executing the first task being obtained and in response to the current temperature being higher than or equal to the first temperature; and suspend the first task in response to a second instruction for suspending the first task being obtained.

3. The method of claim 1, wherein the first task comprises running a process.

4. The terminal of claim 2, wherein the first task comprises running a process.

5. The method of claim 1, wherein before executing, by the terminal, the second task, the method further comprises displaying, by the terminal, a second alert information on the screen of the terminal, wherein the second alert information is used to indicate the current temperature is high.

6. The method of claim 5, wherein the second alert information comprises a selection of executing the second task or not.

7. The method of claim 5, wherein the method further comprises stop displaying, by the terminal, the second alert information after reaching a preset time.

8. The terminal of claim 2, wherein, before the second task is executed, the instructions further cause the processor to be configured to display a second alert information on the screen of the terminal, wherein the second alert information is used to indicate the current temperature is high.

9. The terminal of claim 8, wherein the second alert information comprises a selection of executing the second task or not.

10. The terminal of claim 8, wherein the method further comprises stop displaying, by the terminal, the second alert information after reaching a preset time.

11. The method of claim 1, wherein the first task comprises installing the application.

12. The method of claim 1, wherein the first task is a batch task related to a plurality of applications.

13. The terminal of claim 2, wherein the first task comprises installing the application.

14. The terminal of claim 2, wherein the first task is a batch task related to a plurality of applications.

* * * * *